United States Patent
Devers

(10) Patent No.: US 9,550,507 B2
(45) Date of Patent: Jan. 24, 2017

(54) PORTABLE VALET MECHANISM AND METHOD OF USE

(71) Applicant: Annette Devers, Katy, TX (US)

(72) Inventor: Annette Devers, Katy, TX (US)

(*) Notice: Subject to any disclaimer, the term of this patent is extended or adjusted under 35 U.S.C. 154(b) by 0 days.

(21) Appl. No.: 15/251,441

(22) Filed: Aug. 30, 2016

(65) Prior Publication Data

US 2016/0368516 A1 Dec. 22, 2016

Related U.S. Application Data

(63) Continuation of application No. 14/669,869, filed on Mar. 26, 2015, now Pat. No. 9,457,825.

(51) Int. Cl.
*B62B 3/02* (2006.01)
*B62B 3/00* (2006.01)
*B62B 5/06* (2006.01)

(52) U.S. Cl.
CPC ............ *B62B 3/022* (2013.01); *B62B 3/005* (2013.01); *B62B 5/067* (2013.01)

(58) Field of Classification Search
CPC ............ B62B 3/002; B62B 3/005; B62B 3/02; B62B 3/022; B62B 5/06; B62B 2203/02; B62B 2203/04; B62B 2206/02; B62B 2206/04; B62B 2206/06; B62B 5/067
USPC ............ 280/638, 639, 651, 659, 47.34, 79.3
See application file for complete search history.

(56) References Cited

U.S. PATENT DOCUMENTS

| | | |
|---|---|---|
| 197,979 A | 12/1877 | Ruckwardt |
| 247,382 A | 9/1881 | McCallen |
| 1,832,730 A | 11/1931 | Pack |
| 2,240,561 A | 5/1941 | Grotta |
| D142,059 S | 8/1945 | Botsford |
| 2,901,124 A | 8/1959 | Gingher |
| 3,162,473 A | 12/1964 | George |
| 3,168,329 A * | 2/1965 | Goldschmidt ............ B62B 3/10 108/28 |
| 4,221,402 A | 9/1980 | Kazmark |
| 4,538,709 A | 9/1985 | Williams |
| 4,765,646 A * | 8/1988 | Cheng ..................... B62B 3/022 280/651 |
| 5,090,725 A * | 2/1992 | Feldner .................... B62B 3/02 211/189 |
| 5,738,365 A | 4/1998 | McCarthy |
| D414,625 S | 10/1999 | Stelmarski |
| 6,488,160 B2 * | 12/2002 | Wang ........................ A47F 7/19 211/195 |
| 7,520,513 B1 | 4/2009 | Bush |
| 7,832,574 B1 | 11/2010 | Sexton |
| 7,946,434 B1 * | 5/2011 | Greenspon ......... A47G 25/0685 211/195 |
| 8,820,777 B1 | 9/2014 | Pargansky |
| 8,925,957 B2 * | 1/2015 | Grundvig .................. B62B 3/02 280/39 |
| 2006/0022419 A1 * | 2/2006 | Phillips, II ............... B62B 3/02 280/47.35 |
| 2009/0000894 A1 | 1/2009 | Middup |
| 2014/0131963 A1 | 5/2014 | Bengtzen |

* cited by examiner

*Primary Examiner* — John Walters
(74) *Attorney, Agent, or Firm* — Ira Domnitz

(57) ABSTRACT

A portable valet system and method of use that incorporates a basket for storing items for movement as well as a collapsible hanger assembly that can be used for hanging items while in use. The portable valet system and method of use is collapsible and on wheels for portability.

6 Claims, 5 Drawing Sheets

PORTABLE VALET MECHANISM AND METHOD OF USE

CROSS-REFERENCE TO RELATED APPLICATIONS

This application is a Continuation of, and claims priority to, U.S. patent application Ser. No. 14/669,869, filed Mar. 26, 2015, which is incorporated by reference herein in its entirety.

STATEMENT REGARDING FEDERALLY SPONSORED RESEARCH

Not applicable.

BACKGROUND

The present invention, and inventive system, is a new and novel invention that works as valet, wardrobe carrier, drying ironing station, and article transportation system. One of the problems that the present invention was designed to address was the transportation of clothing, such as, dance costumes from various competitions. The main issue to be overcome was that there were numerous outfits as well as shoes, hat, hoops and other gear that could be utilized at the competition, but there was no easy way to transport them all at the same time. As is sometimes the case, it could take many trips back and forth to the car to get various articles of clothing and gear loaded and unloaded. The present invention is designed, in many embodiments, to overcome that problem.

The present invention is distinguishable from the prior art in the field. The present invention is patentably distinct from U.S. Pat. No. 197,979 to Ruckwardt, entitled "Portable Clothes-Rack." The invention of the Ruckwardt patent is not mobile, or on wheels. The invention of Ruckwardt does not have the capabilities to cart items in a basket, as does the present invention. The invention of Ruckwardt also does not have capabilities to hang garments simultaneously while using a cart, as can be done in the present invention.

The present invention varies from the invention as disclosed in U.S. Pat. No. 247,382 to McCallen entitled "Clothes Rack." The invention of the McCallen patent is not mobile, or on wheels, like the present inventive device. The invention of the McCallen patent is not compact, and cannot fold flat as can many embodiments of the present invention. The invention of McCallen does not provide the option to cart objects and only functions to hang clothes, unlike the present invention.

The present invention is distinguished from U.S. Pat. No. 2,240,561 to Grotta entitled "Portable Clothes Rack." The invention of Grotta does not offer the cart transport aspects of the present invention. The invention of Grotta is not mobile, or on wheels. The invention of Grotta does not have capabilities to hang or cart simultaneously, unlike the present invention.

The present invention is distinguishable from U.S. Pat. No. 2,901,124 to Gingher entitled "Folding Portable Rack" for several reasons. The invention of Gingher does not provide option to cart items in basket section, unlike the present invention. The invention of Gingher requires more tedious set up and adjustments in order to be utilized, unlike the easy to set up qualities of the present invention. The invention of Gingher has no capacity to become compact, or flat, for easy storage and assembly.

The present invention is distinguished from U.S. Pat. No. 3,162,473 to George entitled "Portable Rack" for several reasons. The invention of George does not allow the option to transport hanging garments. The invention of George does not provide wheels for easy transport, unlike the present invention. The invention of George also does not offer a cart to carry additional gear, unlike the present invention.

The present invention is distinguished from U.S. Pat. No. 4,221,402 to Kazmark entitled "Garment Bag Attachment for Portable Luggage Carrier. The invention of Kazmark focuses mainly on transporting of garment bags unlike the present invention, which in many embodiments focuses on the movement of garments themselves. In the Kazmark patent the hanging component is attachable/removable, unlike the present invention in which the hanging component is not attachable or removable, but rather a permanent aspect of the invention. The Kazmark invention is not designed for multiple hangers unlike the wardrobe of the present invention. The invention of Kazmark only uses two wheels whereas the present invention utilizes four wheels. The invention of Kazmark cannot stand upright for loading without assistance unlike the present invention.

The present invention is distinguishable from U.S. Pat. No. 4,538,709 to Williams entitled "Wheeled Garment Bag." Specifically, the invention of Williams is designed to move luggage easily particularly when traveling. The present invention is not related to luggage transportation. Furthermore, the invention of Williams only has two wheels, whereas the present invention requires four wheels. The invention of Williams also does not have option to function as portable wardrobe and hang materials, such as is found in the present invention.

The present invention is distinguished from U.S. Pat. No. 5,738,365 to McCarthy entitled "Collapsible Cart." The invention of McCarthy has no basket. The invention of McCarthy has no handle to push or pull. The invention of McCarthy is not designed for clothes transport. The invention of McCarthy also requires locking pins, whereas the present invention does not require locking pins, but can in some embodiments utilize locking pins.

The present invention is distinguished from U.S. Pat. No. 7,520,513 to Bush entitled "Ultra Portable Wheeled Valet" in many regards. The invention of Bush does not have the cart characteristics of the present invention. The invention of Bush also does not have four wheels, as is found in the present invention. The invention of Bush is not capable as acting as wardrobe, unlike the present invention. The invention of Bush cannot simultaneously cart and carry clothes.

The present invention is distinguishable for the U.S. Pat. No. 7,832,574 to Sexton entitled "Portable Collapsible Garment Support Rack Apparatus for several reasons. The invention of Sexton is not mobile, unlike the present invention. The invention of Sexton has no basket, unlike the present invention. The invention of Sexton does not have the capability to collapse flat, unlike the present invention. The invention of Sexton also does not have capability to both cart and hang clothes simultaneously while in operation.

The present invention is distinguishable from U.S. Pat. No. 8,820,777 to Pargansky entitled "Collapsible Valet Cart." The invention of Pargansky has no basket no cart and no handles to push, unlike the present invention. The invention of Pargansky also requires telescoping pins for operation, unlike the present invention, which only uses telescoping pins as an option. The invention of Pargansky also does not provide simultaneous use of cart and wardrobe, unlike the present invention.

The present invention is distinguished from US Pat. App. 2009/0000894 to Middup entitled "Portable Costume Case with a Collapsible Rack." The invention of Middup is basically a piece of luggage. The invention of Middup contains telescoping poles with pins, which the present invention does not require, but may include as an option. The invention of Middup has no carting capabilities. The invention of Middup can't be pushed when open and extended. The invention of Middup has bars that are separated from the luggage and are not self-contained. The invention of Middup also has only two wheels instead of the four of the present invention.

The present invention is distinguishable from US Pat. App. 2014/0131963 to Bengtzen entitled "Multi-function Cart" in several ways. First the invention of Bengtzen requires hard covers on the exterior of the invention which is not required or contemplated by the present invention. The device of Bengtzen also is not self-contained for functionality to both transport materials and act a hanging device. The invention of Bengtzen also has no vertical wardrobe capabilities, unlike the present inventive device.

The present invention is distinguishable from U.S. D142,059 to Botsford entitled "Portable Clothes Rack" for several reasons. The invention of Botsford is a portable clothe rack and that's its only function. The invention of Botsford has no carting capabilities. It is not mobile and has no wheels. The invention of Botsford has no handles to push/guide/transport. It also appears that the Botsford device cannot fold flat, as can many embodiments of the present invention.

The present invention is distinguished from U.S. D414,625 to Stelmarski entitled "Portable Clothes Rack" for several reasons. First, Stelmarski is basically a clothes stand. The invention of Stelmarski does not have wheels unlike the present invention. The invention of Stelmarski has no carting capabilities. The invention of Stelmarski has also no handles to guide/transport materials.

SUMMARY

In several embodiments of the present invention, the present invention operates under several parameters.

In several embodiments of the present invention, the present invention is designed to have a hanging assembly and a basket assembly in which to store gear. In this embodiment materials such as gear and clothing could be maneuvered at one time rather than being taken in separate trips from one location to another.

In several embodiments of the present invention the invention can be used to move laundry, ironing and/or other goods that are solid or have a solid container. In several embodiments of the present invention, by way of example, a stack of clothes to be ironed could be put into the basket aspect of the present invention.

In several embodiments of the present invention, the present invention is designed to resolve the issues of users having to hang clothing from house items, such as knobs in the kitchen as when someone is ironing, or in a hurry. In the present invention there is a containment area or cart as well as a hanging rod for ironed items. In several embodiments of the present invention, the present invention has a basket containment area.

In several embodiments of the present invention the present invention can be used by individuals to transport laundry and/or other materials as would be fairly common for a college student, or someone who needs to transport materials distances, such as a parent or apartment dweller. The present invention also provides additional hanging space for items, which is beneficial to individuals that do not have large closet space or in cases in which closet space is fully utilized.

In many embodiments of the present invention, the present invention provides an additional opportunity for a user to hang laundry to dry in a portable and moveable framework. In several embodiments of the present invention the present invention can be utilized for professional sports teams or sports professionals to transport goods. In one of the embodiments of the present invention the present invention can hang garments and transport garments simultaneously. In several embodiments of the present invention the present invention is collapsible. In several embodiments of the present invention, all parts/components of the invention are self-contained, in that the item is one unit. In several embodiments of the present invention the present invention has handles that may provide for ease of pushing or pulling the present invention. In several embodiments of the present invention, the present invention can collapse for storage in a manner similar to a folding chair, or metal luggage piece. In several embodiments of the present invention the present invention is light weight and easily portable. In several embodiments of the present invention the present invention can be stored horizontally or vertically when not in use.

In many embodiments the present invention is a portable valet system comprising: a hanger assembly; said hanger assembly further comprising two top frames with wire clasps and a hanger bar mechanically attached and rotatable about one top frame; a basket assembly; said basket assembly further comprising two bottom frames, a front wheel assembly, a back wheel assembly, and several mesh panels forming a basket with a mesh bottom; and a push bar attached to said one bottom frame and said front wheel assembly; wherein said top frames are attached in rotational mechanical communication with said two bottom frames. In several embodiments the portable valet system further comprises: said wire clasps lock the hanger assembly into an upright position relative to the bottom frames. In several embodiments the portable valet system further comprises: said hanger bar has a hook distal to the end attached to said clasp. In several embodiments the portable valet system further comprises: said push bar has a handle distal to the end attached to said front wheel assembly. In several embodiments the portable valet system further comprises: said push bar is attached to said one bottom frame at a hinge. In several embodiments the portable valet system further comprises: said two bottom frames, a front wheel assembly, a back wheel assembly, and several mesh panels forming a basket with a mesh bottom are all attached at hinge point. In several embodiments the portable valet system further comprises: said hanger assembly, said basket assembly, and said push bar are collapsible at said hinge assemblies.

In several embodiments the present invention is a portable valet system comprising: a hanger assembly; said hanger assembly further comprising a front top frame with a wire clasp, a back top frame with a wire clasp, a hanger bar mechanically attached and rotatable about the back top frame; a basket assembly; said basket assembly further comprising a front bottom frame, a back bottom frame, a front wheel and assembly, a back wheel assembly, four side panels, and a bottom mesh panel forming a basket with a mesh bottom; said front bottom frame is mechanically attached via a pivot point to at least two side panels; said back bottom frame is mechanically attached via a pivot point to at least two side panels; said front bottom frame and said back bottom frame are mechanically attached via pivot point to said bottom mesh panel; a push bar attached to said one bottom back frame and said front wheel assembly via a pivot point; wherein said top frames are attached in rotational mechanical communication with said two bottom frames via pivot points. In several embodiments the portable valet system further comprises: said wire clasps lock the hanger assembly into an upright position relative to the bottom frames. In several embodiments the portable valet system further comprises: said hanger bar has a hook distal to the end attached to said clasp. In several embodiments the portable valet system further comprises: said push bar has a handle distal to the end attached to said front wheel assembly. In several embodiments the portable valet system further comprises: said push bar is attached to said one bottom frame at a hinge. In several embodiments the portable valet system further comprises: said two bottom frames, a front wheel and assembly, a back wheel assembly, and several mesh panels forming a basket with a mesh bottom are all attached at hinge point. In several embodiments the portable valet system further comprises: said hanger assembly, said basket assembly, and said push bar are collapsible at said hinge assemblies.

In several embodiments of the present invention the invention is a method for using a portable valet system comprising the steps of: obtaining a hanger assembly; said hanger assembly further comprising a front top frame with a wire clasp, a back top frame with a wire clasp, a hanger bar mechanically attached and rotatable about the back top frame; said basket assembly further comprising a front bottom frame, a back bottom frame, a front wheel and assembly, a back wheel assembly, four side panels, and a bottom mesh panel forming a basket with a mesh bottom; said front bottom frame is mechanically attached via a pivot point to at least two side panels; said back bottom frame is mechanically attached via a pivot point to at least two side panels; said front bottom frame and said back bottom frame are mechanically attached via pivot point to said bottom mesh panel; a push bar attached to said one bottom back frame and said front wheel assembly via a pivot point; wherein said top frames are attached in rotational mechanical communication with said two bottom frames via pivot point; and unfolding said portable valet system from a collapsed form by pushing said front lower brace away from said back lower brace. In several embodiments the portable valet system further comprises: rotating said top frames away from said lower frames; and rotating said wire clasps in order to secure said top frames in an extended position from said lower frames. In several embodiments the portable valet system further comprises: rotating said hanger bar about said clasp and having the distal end of said hanger bar mechanically engage said top front frame. In several embodiments the portable valet system further comprises: folding said portable valet system from an extended form by pulling said front lower brace upward and toward said back lower brace.

In at least on embodiment of the present invention, the present invention is a portable valet system comprising: a hanger assembly; said hanger assembly further comprising two top frames with clasps and a hanger bar mechanically attached to and rotatable about one top frame; a basket assembly; said basket assembly further comprising two bottom frames, a front wheel assembly, a back wheel assembly, and several mesh panels forming a basket with a mesh bottom; and at least one push bar attached to said one bottom frame and said front wheel assembly; wherein said top frames are attached in rotational mechanical communication with said two bottom frames. In one embodiment of the present invention said clasps lock the hanger assembly into an upright position relative to the bottom frames. In one embodiment of the present invention said hanger bar has a hook distal to the end attached to one said top frame. In one embodiment of the present invention said at least one push bar has a handle distal to the end attached to said front wheel assembly. In one embodiment of the present invention said push bar is attached to said bottom frames at hinges. In one embodiment of the present invention said two bottom frames, a front wheel and assembly, a back wheel assembly, and several mesh panels forming a basket with a mesh bottom are all attached at hinge points. In one embodiment of the present invention said hanger assembly, said basket assembly, and said push bar are collapsible at said hinge assemblies. In one embodiment of the present invention said two top frames have adjustable length capabilities relative to the bottom frames, in some embodiments using a telescoping device and pins.

In one embodiment of the present invention the present invention is a portable valet system comprising: a hanger assembly; said hanger assembly further comprising two top frames and a hanger bar mechanically attached to and rotatable about one top frame; a basket assembly; said basket assembly further comprising four bottom frames, a front wheel assembly, a back wheel assembly, and several mesh panels forming a basket with a mesh bottom; and at least one push bar attached to said one bottom frame and said front wheel assembly; wherein said top frames are attached in telescoping mechanical communication with said four bottom frames. In one embodiment of the present invention said four bottom frames further comprise; a lock on said four bottom frames to maintain the hanger assembly into an upright and extended position relative to said four bottom frames. In one embodiment of the present invention said hanger bar further comprises; a hook distal to one said top frame. In one embodiment of the present invention said at least one push bar has a handle distal to the end attached to said front wheel assembly. In one embodiment of the present invention said at least one push bar is attached to said bottom frames at hinges. In one embodiment of the present invention said four bottom frames, a front wheel and assembly, a back wheel assembly, and several mesh panels forming a basket with a mesh bottom are all attached at hinge points. In one embodiment of the present invention said hanger assembly, said basket assembly, and said a least one push bar are collapsible at said hinge assemblies. In one embodiment of the present invention said two top frames have adjustable length capabilities relative to said four bottom frames by telescoping out of said four bottom frames.

In one embodiment of the present invention, the present invention is a method for using a portable valet system comprising the steps of: obtaining a hanger assembly; said hanger assembly further comprising a lockable front top frame, a lockable back top frame, a hanger bar mechanically attached and rotatable about the back top frame; obtaining a basket assembly; said basket assembly further comprising at least one bottom frame, a at least one back bottom frame, a front wheel assembly, a back wheel assembly, four side panels, and a bottom mesh panel forming a basket with a mesh bottom; said at least one front bottom frame is mechanically attached via a pivot point to at least two side panels; said at least one back bottom frame is mechanically attached via a pivot point to at least two side panels; said at least one front bottom frame and said back bottom frame are mechanically attached via pivot point to said bottom mesh panel; at least one push bar attached to said one bottom back frame and said front wheel assembly via a pivot point; wherein said top frames are attached in mechanical communication with said at least one bottom front frame and at least one bottom back frame, and unfolding said portable valet system from a collapsed form by pushing said at least one lower front frame away from said at least one lower back frame. In one embodiment of the present invention the method further comprises folding said portable valet system from an extended form by pulling said at least one lower frame upward and toward said at least one lower back frame.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
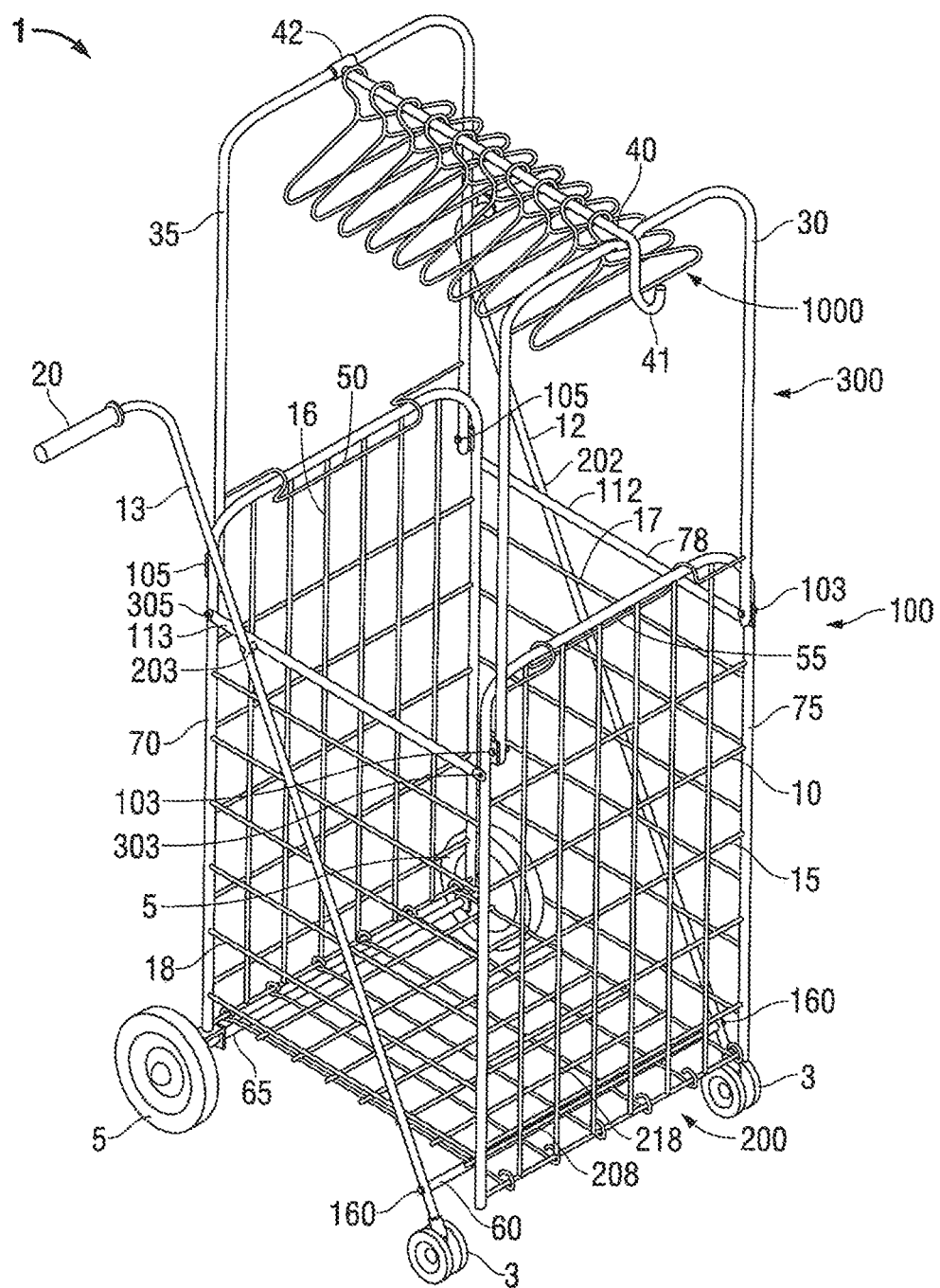
FIG. 1 illustrates one embodiment of the present invention in assembled view with hanger assembly implemented.

In the following description, certain details are set forth such as specific quantities, sizes, etc. . . . so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing particular embodiments of the disclosure and are not intended to be limiting thereto. Drawings are not necessarily to scale.

One, or more, illustrative embodiments incorporating the invention disclosed herein are presented below. Applicants have created a revolutionary and novel system and method of a portable valet system and method of use.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 11th Edition, 2008. Definitions and/or interpretations should not be incorporated from other patent applications, patents, or publications, related or not, unless specifically stated in this specification or if the incorporation is necessary for maintaining validity. "Pivot points" as used herein can mean clamps, hinges or other mechanical devices that allow for rotation or movement about a central point. "Pins" as used herein can mean locking pins, spring loaded pins, and/or telescoping pins as known and used in the industry. "Push bars" as defined herein do not need to extend past the basket assembly as defined below in all embodiments of the present invention (example FIG. 6). Push bars can be substantially flush with the lower front and back braces and need not extend past the panels of the basket assembly in all embodiments of the present invention. "Mesh" as defined herein is defined as any type of barrier, whether it be metal, non-metal, solid, pliable, or porous solid material. The terms "braces" and/or "frames" may be uses interchangeably throughout this specification. "Valet" as defined herein is defined as any type of portable transport device capable of moving solid objects.

FIG. 1 shows one embodiment of the present invention 1 in an assembled view. As illustrated the portable valet 1 is shown with the hanger assembly 300 in extended and operational form. The basket assembly 200 is also illustrated. Both the hanger assembly 300 and the basket assembly 200 can be of variable dimensions and sizes. In many embodiments of the present invention the portable valet 1 maybe comprised of metal, hard plastic or other materials designed to provide structure and support weight.

As illustrated, hanger assembly 300 in extended and operational form. In many embodiments of the present invention the hanger assembly 300, when extended, extends over the basket assembly 200. In many embodiments of the present invention the hanger assembly 300 is preferably constructed with a front frame 30 and a back frame 35. Both the frames 30 and 35 are preferably constructed with a "U" shape, but can be constructed of other geometric shapes as well. Both frames 35 and 30 may be comprised of metal, or some other solid materials capable of supporting structure and weight. As illustrated hanger bar 40 is mechanically attached to the back frame 35 about the rotation clamp 42, or pivot point. In other embodiments of the present invention the hanger bar 40 may be attached to the front frame 30 via rotation clamp 42. Rotational clamp 42 may be a clamp or hinge joint as is known in the industry.

Figure 6:
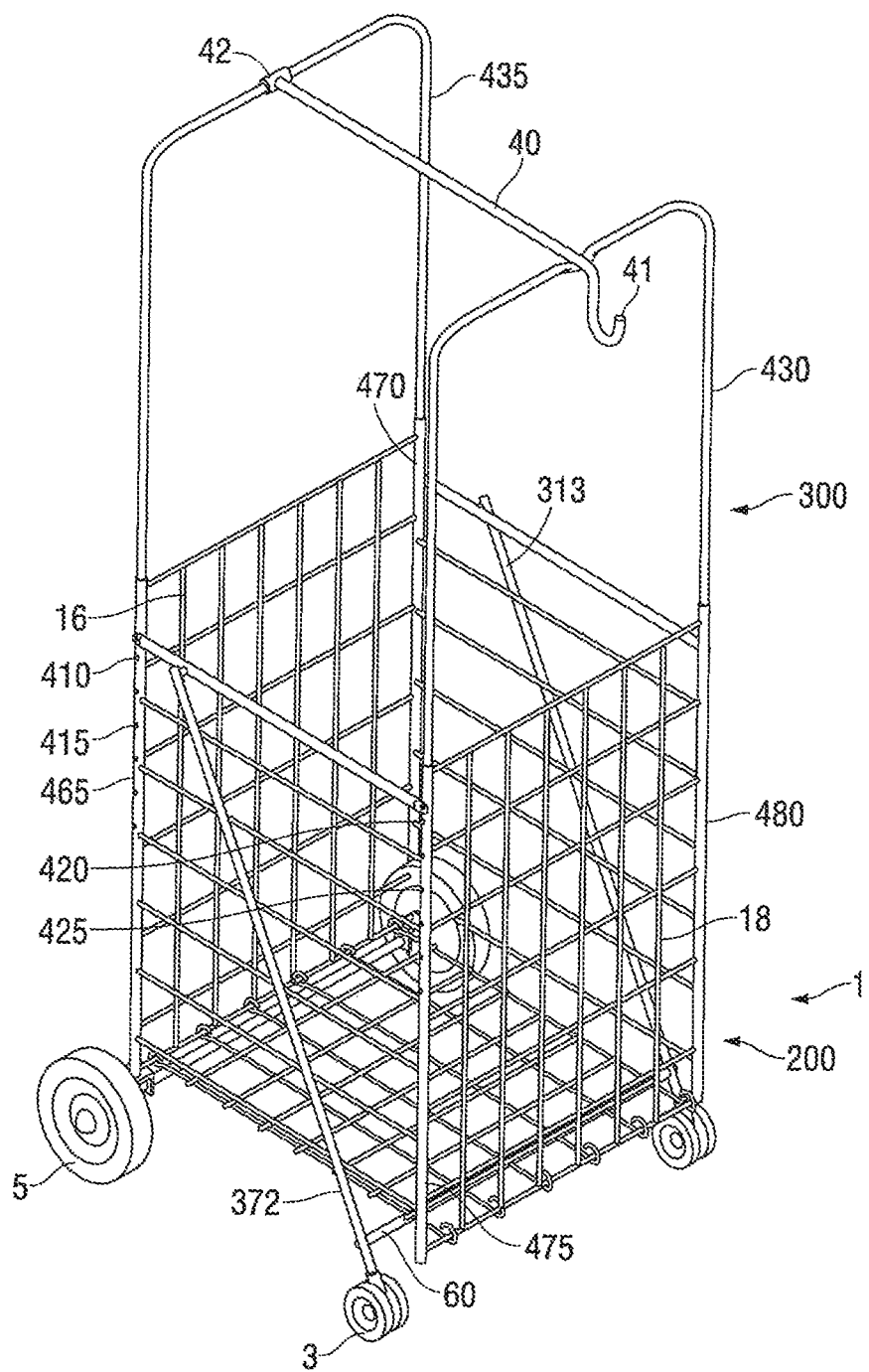
FIG. 6 illustrates one embodiment of the present invention in assembled view with hanger assembly implemented with telescoping frames.

Also illustrated are optional hangers 1000 hanging on the hanger bar 40. Hangers 1000 maybe common hangers as are known in the industry, and are shown for illustrative purposes only. As shown in FIG. 1, in several embodiments there is a clamp wire 50 which runs between the two arms of the back frame 35 and there is a clamp wire 55 which runs between the two arms of the front frame 30. FIG. 6 illustrates frames 430 and 435 which may be of adjustable height. During operation the clamp wires 55 and 50 can move over the top edge of the back frame 70 and the front frame 75 therein keeping the back brace 35 and front brace 30 in an upright position. Such usage of the clamp wires 55 and 50 is similar to that of some metal luggage transports. Clamp wires 55 and 50 may also provide additional structural stability for the frames 35 and 30. Illustrated is an optional hook 41 embodiment on the hanging bar 40. As illustrated the hook 41 is designed to offer additional hanging capability on the hanging bar 40. Hook 41 can be of varying geometrical shapes in various embodiments of the present invention.

Figure 3:
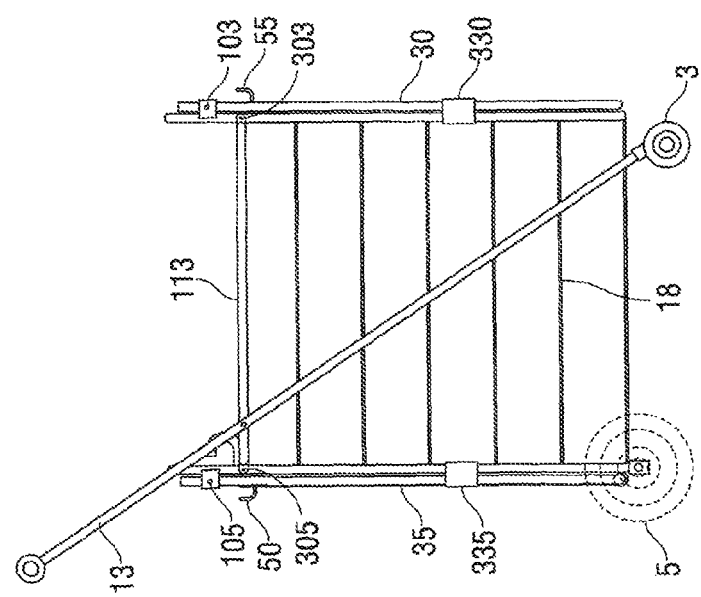
FIG. 3 illustrates one embodiment of the present invention in side view with the hanger assembly not implemented.

As illustrated, basket assembly 200 is connected to the hanger assembly 300 at various pivot points 105 and 103. Pivot points 105 and 103 can be hinges, nuts and bolts, or other rotational attachments as are known in the art. As illustrated, (FIGS. 1 and 3) in several embodiments of the present invention, the front frame 30 maybe attached to the basket front frame 75 at pivot points 303. As illustrated the back frame 35 may attach to the basket back frame 70 at pivot point 305 (FIGS. 1 and 3). Pivot points 103, 105, 303 and 305 are juncture points and attachment points such as those known in the art for attachment with rotation, such as a hinge joint.

As illustrated, front frame 75 and back frame 70 are preferably constructed with a "U" shape, but can be constructed of other geometric shapes as well, such as, but not limited to, a "V" shape or a squared "U" shape. Both frames 70 and 75 may be comprised of metal, or some other solid materials capable of supporting structure and weight. The back frame 70 and front frame 75 are connected, in some embodiments of the present invention, by two bars 78 which form the upper portion side frame of the basket assembly 200. In many embodiments of the present invention, the two bars 78 are connected to the respective frames 75 and 70 in a manner known in the art that allows for rotation about the pivot points 303 and 305. In several embodiments of the present invention, the four side faces of the basket assembly 300 are constructed of metal mesh and are referenced as back mesh 16, front mesh 15, side mesh 17 side mesh 18 and the bottom mesh 218. However, in several embodiments of the present invention the mesh 15, 16, 17, 18, or 218 can be a solid but foldable and/or pliable material so that the overall valet 1 is still collapsible, achievable by connecting the mesh 15, 16, 17, 18 to 70 and 75 in a manner that allows rotation via pivot points, such that when the present invention is not in use, it can be folded for easy storage as is known in the art. Such materials could be, but are not limited to, woven fabrics or plastics.

As illustrated meshes 16 and 15 are shown to have a square mesh pattern although other patterns as are known in the art can be used. It is also envisioned that in several embodiments of the present invention all mesh panels are actual solid piece and may also be comprised of other solid or meshed non-metal materials. As illustrated side mesh panels 17 and 18 are shown to have horizontal bars although other patterns as known in the art can be used. All mesh panels 15, 16, 17, 18 and 218 maybe comprised of metal or other materials that are capable of supporting weight. All side mesh panels 17 and 18 are mechanically attached with each relevant edge or to the frames 70 and 75 respectively in a manner known in the art as is found in collapsible trundle baskets.

As illustrated in FIG. 1, the bottom portion of the basket assembly 200 is constructed of lower mesh panel 218, which acts as a base for the basket assembly 200. As illustrated the lower mesh panel 218 is joined to the mesh panels 15 and 16 in a manner that allows rotation such that when the present invention is not in use it can be folded for easy storage as is known in the art. In some embodiments the lower mesh panel 218 can be capable of supporting weight in excess of 100 lbs. Lower mesh panel 218 maybe comprised of a solid material piece or have mesh in a non-rectangular pattern. Lower mesh panel 218 may be comprised of a non-metallic material as known in the art.

As illustrated in FIG. 1 the portable valet 100 is maneuverable. As illustrated there is a bottom front axle 60 which traverses that lower mesh panel 218. In many embodiments, the bottom front axle 60 is joined and attached at 160 to push bars 13 and 12 on the outsides of the mesh 17 and 18, although other attachments as are known in the art for an assembly may be used. In many embodiments of the present invention, the push bars 13 and 12 also attach at upper frame bars 78 and rotatable junctures 203. Rotatable junctures 203 are of those known in the art for use in collapsible transport arm rotations or the like. In many embodiments, at the end of the push bars 12 and 13 are two wheels 3 on coasters designed to be able to rotate about the coasters in a fashion similar to those as used in the front end of a stroller or cart. On the area of the push bars 13 and 12 distal to the wheels 3 are handles 20, which may extend away from the basket assembly 200. The handles 20 may be comprised in a variety of shapes including those as used standard in the industry for movement of a basket on wheels. The axle 60 and wheels 3 together are the front wheel assembly 260 (FIG. 2).

As illustrated in FIG. 1, at the bottom of the mesh panel 16 is the axle rod 65 which runs through the lower mesh 218. Attached at the end of the axel rod 65 are wheels 5. The axle rod 65 and wheels 5 together are the rear wheel assembly 265 (FIG. 2). Although illustrated as being larger than then wheels 3, the back wheels 5 may of any size as would be used in the art. As shown in FIG. 1 the wire clasps 55 and 50 are extended over the frames 75 and 70 therein holding the upper frames 30 and 35 in place. In many embodiments of the present invention the back wheels 5 may articulate like the wheels 3.

Figure 2:
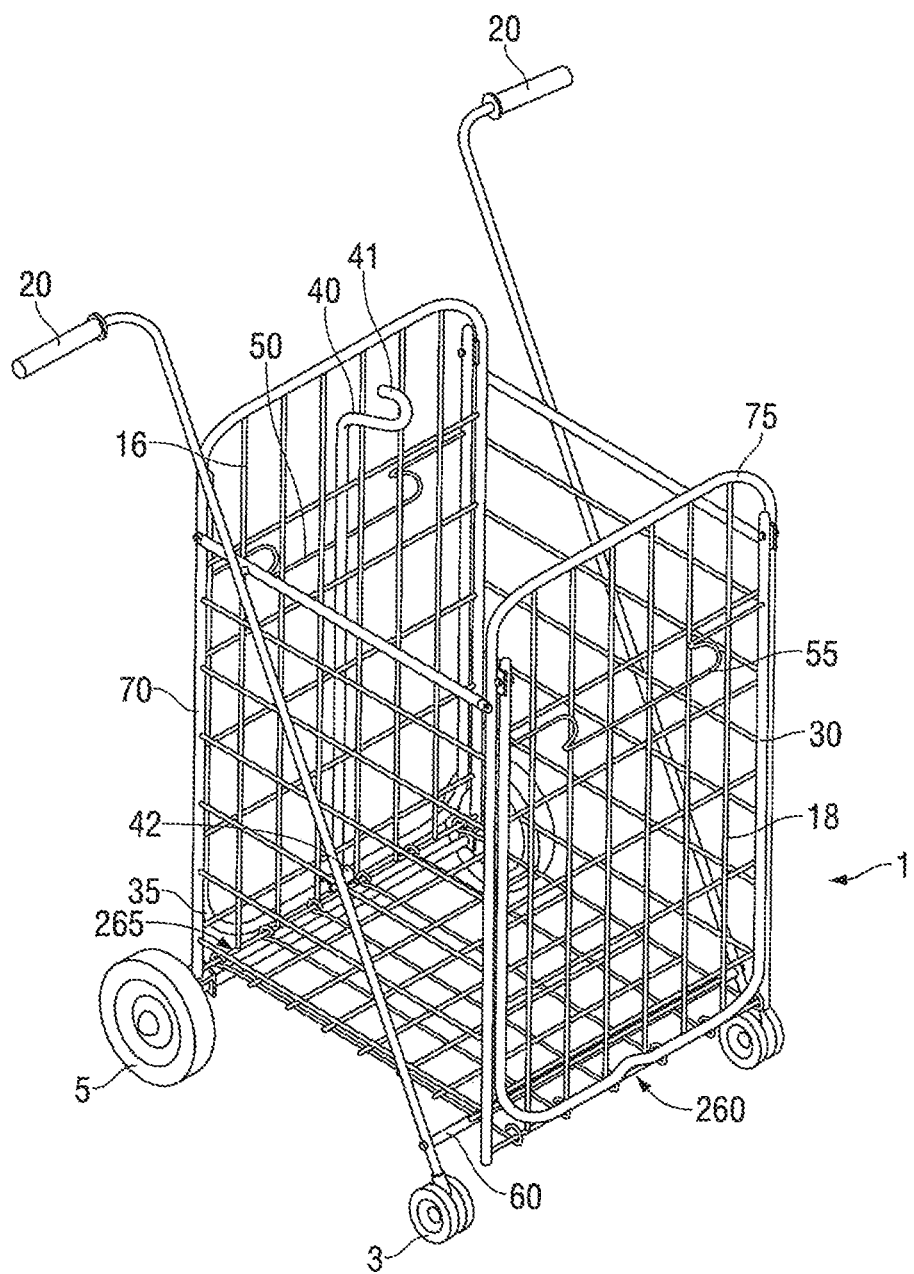
FIG. 2 illustrates one embodiment of the present invention in an assembled view with the hanger assembly not implemented.

As illustrated in FIG. 2, one embodiment of the present invention in an assembled form in which the hanger assembly 300 not implemented. As shown in this figure the back frame 35 is folded behind the mesh panel 16. In several embodiments of the present invention the back frame 35 can fold in front of the mesh panel 16 and be in the interior basket of the basket assembly 200. As shown in this embodiment, back frame 35 is rotated about the pivot points 105 which can be hinge joints. As shown, the hanger bar 40 can also be rotated about the rotation clamp 42 and be in contact with the mesh 16.

As illustrated in FIG. 2, one embodiment of the present invention in an assembled form in which the hanger assembly 300 not implemented. As shown in this figure the front frame 35 is folded in front of the mesh panel 16. In several embodiments of the present invention the front frame 30 can fold in back of the mesh panel 18 and be in the interior basket of the basket assembly 200. Front frame 30 is rotated about the pivot points 103 which can be hinge joints.

As illustrated in FIG. 3, here is one embodiment of the present invention in an assembled form in which the hanger assembly 300 not implemented in a side view. As shown in this figure the back frame 35 is folded behind the mesh panel 16. In several embodiments of the present invention the back frame 35 can fold in front of the mesh panel 16 and be in the interior basket of the basket assembly 200. In this embodiment, back frame 35 is rotated about the pivot points 105 which can be hinge joints. As shown, the hanger bar 40 can rotate about the rotation clamp 42 and be in contact with the mesh 16. As illustrated the wire clamp 50 is in a disengaged position.

As illustrated in FIG. 3, here is one embodiment of the present invention in an assembled form in which the hanger assembly 300 not implemented in side view. As shown in this figure the front frame 40 is folded in front of the mesh panel 15. In several embodiments of the present invention the front frame 30 can fold in back of the mesh panel 15 and be in the interior basket of the basket assembly 200. Front frame 30 is rotated about the pivot points 103 which can be hinge joints. As illustrated the wire clamp 55 is in a disengaged position. As illustrated in FIG. 3, there are two optional clamps 330 and 335 which can, on some embodiments be used to secure the upper frames 30 and 35 to the lower frames 70 and 75, as is known in the art, when the upper frames 35 and 30 are disengaged and folded to the basket assembly 200.

Figure 4:
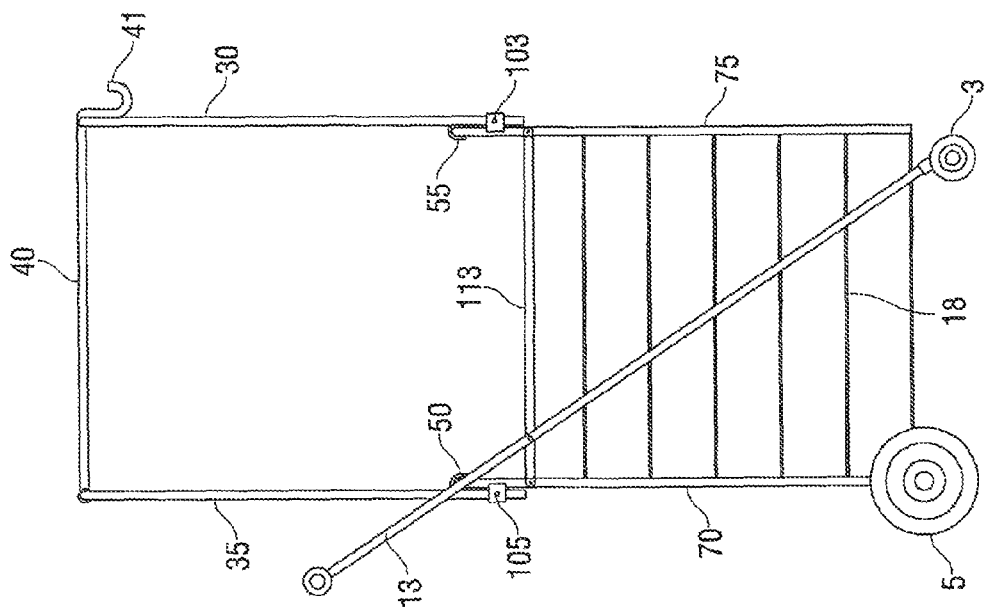
FIG. 4 illustrates one embodiment of the present invention in side view with the hanger assembly implemented.

As illustrated in FIG. 4, here is one embodiment of the present invention in an assembled form in which the hanger assembly 300 is implemented in a side view. As shown in this figure the back frame 35 is extended above the mesh panel 16. In this embodiment of the present invention the clamp wire 50 is clamped over the upper "U" of the back frame 70 holding the upper frame 35 in place. In several embodiments of the present invention, back frame 35 is rotated about the pivot points 105 which can be hinge joints. As shown, the hanger bar 40 can rotate about the rotation clamp 42 and is extended in engagement between back frame 35 and front frame 30.

As illustrated in FIG. 4, here is one embodiment of the present invention in an assembled form in which the hanger assembly 300 is implemented in a side view. As shown in this figure the front frame 30 is extended above the mesh panel 15. In this embodiment the clamp wire 55 is clamped over the upper "U" of the back frame 75 holding the upper frame 30 in place. Front frame 35 is rotated about the pivot points 103 which can be hinge joints. As shown, the hanger bar 40 can rotate about the rotation clamp 42 and is extended in engagement between back frame 35 and front frame 30.

Figure 5:
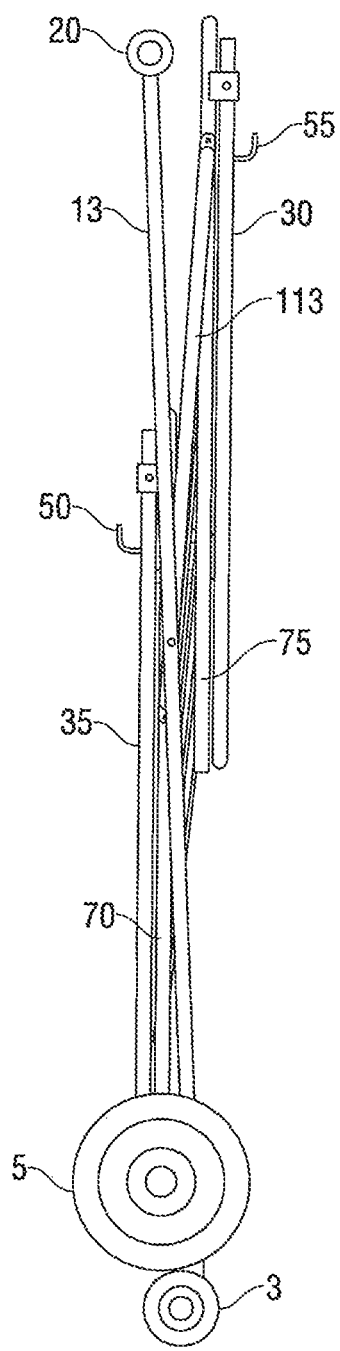
FIG. 5 illustrates one embodiment of the present invention in folded storage form.

As illustrated in FIG. 5 is one embodiment of the present invention in folded form. As shown in many embodiments the present invention 1 can be folded down into a compact form. As shown when the present invention 1 is compacted the wheels 5 and 3 are in close proximity to each other. In order of layers while compacted, in many embodiments of the present invention the distal layer (as shown on the right on FIG. 5) is the front frame 30 which has been rotated about the pivot point 103. Also connected to 103 is front frame 75 and stabilizing bars 112 and 113 respectively (see also FIG. 1) Connected on the opposite end to stabilizing bars 112 and 113 are the push bars 12 and 13 respectively via the pivot point 202 and 203 respectively. As illustrated, when in folded position the handles 20 are fairly close to the pivot point 103. Next connected to the stabilizing bars 112 and 113 respectively via the pivot points 105 is the back frame 70. The back frame 70 is finally attached to the upper frame 35 at pivot point 105. It is envisioned that in many embodiments of the present invention the present invention 1 can collapse and be compacted in a manner similar to that of a wheeled basket.

FIG. 6 shows one embodiment of the present invention 1 in an assembled view with telescoping hanger assembly. In this embodiment of the present invention, the upper braces 430 and 435 have a telescoping capability, as known in the art, about the lower braces 465, 470, 475 and 480 respectively. In this embodiment of the present invention the upper brace 435 can fit inside the hollow lower brace 465 and 470 respectively, in a telescoping manner such as that known in the art such as used with hand trucks. In this embodiment of the present invention the upper brace 430 can fit inside the hollow lower brace 475 and 480 respectively, in a telescoping manner such as that known in the art such as used with hand trucks. In this embodiment of the present invention the lowers braces 465, 470, 475, and 480 are all separate pieces, although other embodiments in which the two braces 470 and 465 maybe joined as well as the two braces 475 and 480 may be joined are envisioned.

As shown in FIG. 6, the lower braces 465, 470, 475 and 480 will have, preferably, perforation on the sides 415 and 420. As shown the perforations 415 and 425 are on braces 465 and 475 respectively, although like corresponding perforations can also be found on the sides of braces 470 and 480. In this embodiment, the height adjustment could be controlled by using spring loaded pins 410 and 420 mounted on 430 and 435, or other pinning mechanisms as known in the art, working together with perforations 415 and 420 predrilled onto 465, 470, 475, and 480. Although not illustrated, the upper braces 435 and 430 could have corresponding predrilled holes and spring loaded pins to correspond with the perforations or predrilled holes on the lower braces 465, 470, 475 and 480 as known in the art for use in a pinned telescoping pole. An alternative to spring-loaded pins 410 and 420 could be quick compression style clamps (like you see on some luggage carts) or combinations of other pinning mechanisms as known in the art. In those embodiments of the present invention, perforations 415 and 420 may not be necessary.

FIG. 6 also shows one embodiment of the present invention 1 in an assembled view with telescoping hanger assembly. In this embodiment of the present invention, the push bars 312 and 313 do not extent past the body of the basket assembly 200 and will be flush with the basket assembly 200 when the valet 1 is collapsed.

The present invention can operate in the following manner (FIG. 1). As shown the invention 1 already has the hanger assembly 300 extended. Materials can be placed into the basket assembly 200 of the present invention. Such materials can include, but are not limited to books, clothes, groceries, or other liquid, or gases in solid containers for transport. The wheels 5 and 3 allow for the invention 1 to be moved through the application of force to the handles 20 down to the wheels 3 through the push bars 12 and 13 (or per FIG. 6, force can be applied to the valet 1 directly on the basket assembly 200 or hanger assembly 300.) As shown when the hangar rod 40 is actively in communication with frame 35 and frame 30 hangers 1000 can be placed and supported by the hangar bar 40 and garments or other materials can be hung from said hangers 1000. As shown the clamp wires 50 and 55 are designed to wrap around the "U" portion of the frames 70 and 75 respectively securing the upper frame 35 and 30 to the frames 70 and 75 thereby preventing the upper frames 35 and 30 from falling. When fully assembled in this manner a user can push or pull the invention 1 to any desired location.

In several other embodiments of the present invention, the present invention can operate in the following manner (FIG. 2). As shown the invention does not have the hanger assembly 300 extended. Materials can be placed into the basket assembly 200 of the present invention. Such materials can include, but are not limited to books, clothes, groceries, or other liquid, or gases in solid containers for transport. The wheels 5 and 3 allow for the invention to be moved through the application of force to the handles 20 down to the wheels 3 through the push bars 12 and 13. When fully assembled in this manner a user can push or pull the invention 1 to any desired location.

In order the collapse the present invention 1 (FIG. 1) the following steps are suggested. All materials including hangers 1000 and any materials in the basket assembly 200 are removed. The hanger bar 40 is then rotated about the clasp 42 away from the frame 30. The clamp wires 50 and 55 are disengaged from the "U" portion of the frames 70 and 75 respectively allowing the upper frame 35 and 30 to rotate relative to the frames 70 and 75. In order to disengage the basket assembly 200, the "U" portion of the frame 75 is pulled upward thereby allowing pivoting about the pivots 65, 103, and 105 respectively causing the basket assembly to collapse in a manner as known in the art as to be collapsible in a manner to minimize width of the transportable item. As shown in FIG. 3, clamps 330 and 335 can, as an option secure the upper frames 30 and 35 to the lower frames 70 and 75, in a manner known in the art.

Although several preferred embodiments of the present invention have been described in detail herein, the invention is not limited hereto. It will be appreciated by those having ordinary skill in the art that various modifications can be made without materially departing from the novel and advantageous teachings of the invention. Accordingly, the embodiments disclosed herein are by way of example. It is to be understood that the scope of the invention is not to be limited thereby.

The invention claimed is:

1. A portable valet system comprising:
   a hanger assembly;
      said hanger assembly further comprising a first top frame and a second top frame and a hanger bar mechanically attached to said first top frame and rotatable about said first top frame;
   said hanger bar further comprising a hook distal to said first top frame about which said hanger bar is rotated and extruding past said second top frame but not engaging said second top frame;
   a basket assembly;
      said basket assembly further comprising four bottom frames, a front wheel assembly, a back wheel assembly, and several mesh panels forming a basket with a mesh bottom; and
   at least one push bar attached to said one bottom frame and said front wheel assembly; wherein
   said first and second top frames are attached in telescoping mechanical communication with said four bottom frames.

2. The portable valet system of claim 1 further comprising:
   said four bottom frames further comprise; a lock on said four bottom frames to maintain the hanger assembly into an upright and extended position relative to said four bottom frames.

3. The portable valet system of claim 2 further comprising:
   said at least one push bar has a handle distal to the end attached to said front wheel assembly.

4. The portable valet system of claim 2 further comprising:
   said at least one push bar is attached to said bottom frames at hinges.

5. The portable valet system of claim 2 further comprising:
   said four bottom frames, a front wheel and assembly, a back wheel assembly, and several mesh panels forming a basket with a mesh bottom are all attached at hinge points.

6. The portable valet system of claim 2 further comprising:
   said first top frame and second top frame have adjustable length capabilities relative to said four bottom frames by telescoping out of said four bottom frames.

* * * * *